March 7, 1933.  V. MULHOLLAND  1,900,362
FOREHEARTH FOR MOLTEN GLASS
Filed June 14, 1930  3 Sheets-Sheet 1

March 7, 1933.  V. MULHOLLAND  1,900,362

FOREHEARTH FOR MOLTEN GLASS

Filed June 14, 1930  3 Sheets-Sheet 2

Witness:
S. S. Grotta

Inventor:
Vergil Mulholland
by Brown & Parham
Attys.

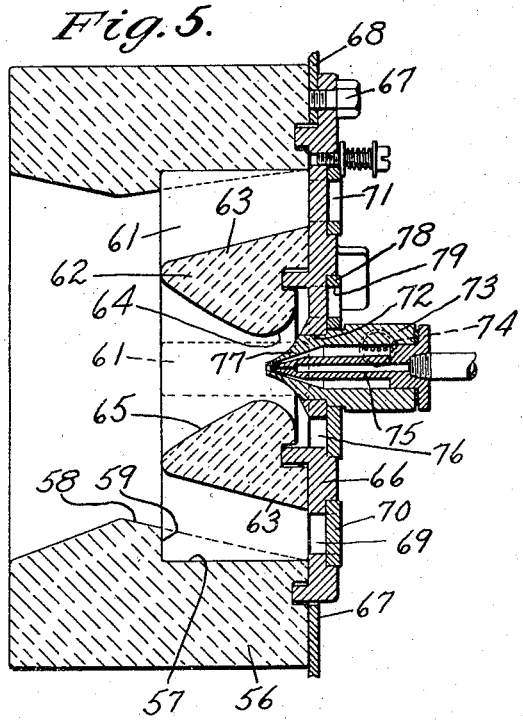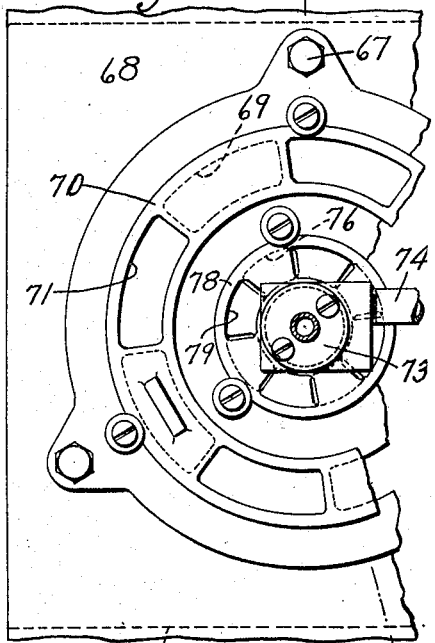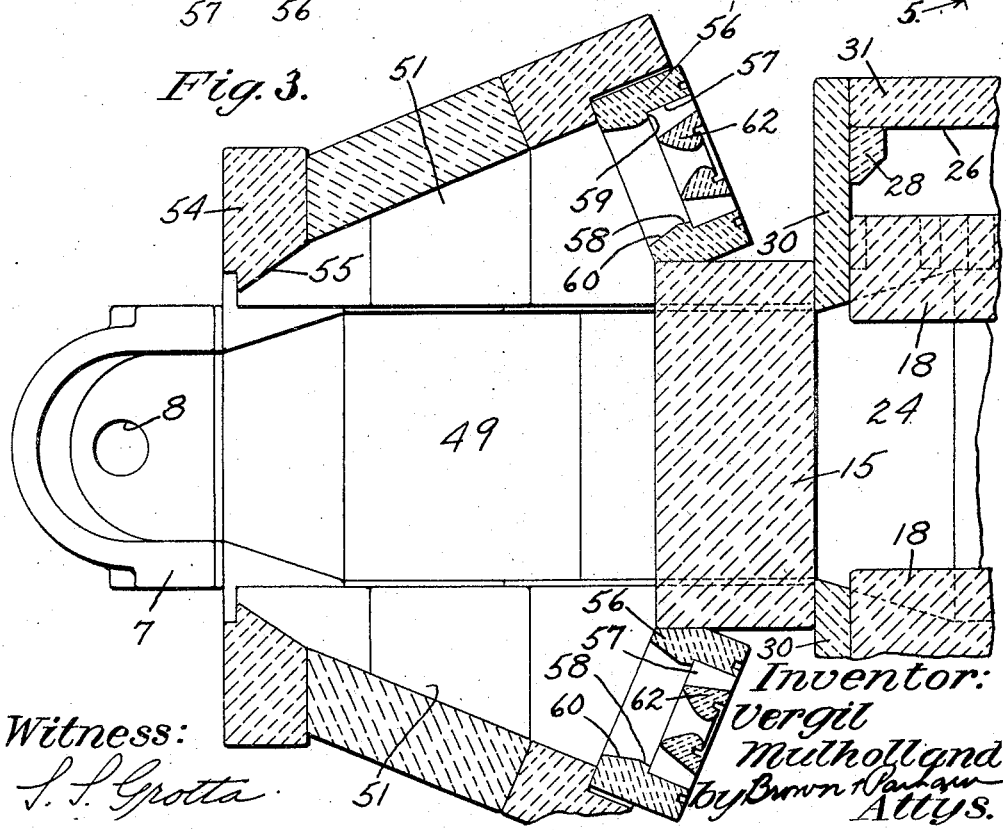

Patented Mar. 7, 1933

1,900,362

UNITED STATES PATENT OFFICE

VERGIL MULHOLLAND, OF WEST HARTFORD, CONNECTICUT, ASSIGNOR TO HARTFORD-EMPIRE COMPANY, OF HARTFORD, CONNECTICUT, A CORPORATION OF DELAWARE

FOREHEARTH FOR MOLTEN GLASS

Application filed June 14, 1930. Serial No. 461,132.

This invention relates to a forehearth for receiving molten glass from a melting furnace and for conducting such glass in a stream to a feed spout, gathering basin or other place at which glass is to be fed through an outlet, gathered by suction gathering receptacles or otherwise removed.

The invention has particular reference to a forehearth wherein the temperature, viscosity and condition of the glass received from the melting furnace may be regulably controlled during the passage of such glass toward the place at which glass is to be removed and the glass maintained at a desirable temperature when the same has been attained.

It is well known that the glass at the sides and bottom of a stream flowing from a melting furnace along a forehearth channel or like conduit tends to flow more slowly and to become cooler than the glass of the middle portion of such stream. This condition is known as "channeling" and is objectionable in that it may preclude the removal at the delivery end of the forehearth channel or conduit of glass sufficiently uniform in temperature, viscosity and condition, to permit the use of such glass in the manner and for the purpose intended, as for fabrication into satisfactory articles of glassware. The glass at the side and bottom portions of the stream may become practically stationary and may devitrify or become "cordy" when "channeling" exists. Portions of the devitrified glass may "slough off" and be entrained with the relatively hot or fluid glass of the median portion of the stream. This condition of course is unsatisfactory.

In view of the tendency of the glass stream flowing from the melting furnace along the forehearth channel, to "channel" it is desirable that provision be made to regulably control the temperature of the glass stream so as to obtain a substantially uniform rate of flow and a substantially uniform proper temperature and viscosity condition in the glass throughout the cross section of the stream before such glass reaches the place at which glass is to be fed through an outlet in mold charges or otherwise removed for fabrication into articles of glassware.

It has heretofore been proposed to apply heat locally to the glass of the side or border portions of the stream and to regulably control the amount of heat radiation from the middle portion of the stream with a view to decreasing the rate of flow of and cooling of the glass of the middle portion of the stream and at the same time preventing substantial decrease of flow and undue lowering of temperature of the glass of the side portions of the stream, to the end that a condition of substantially uniform temperature and viscosity throughout the cross section of the stream may be established. The prior copending application of the present applicant and Alfred R. Hunter, Serial No. 401,-831, filed Oct. 23, 1929, discloses and claims a forehearth having heat applying and radiation controlling means of the type just described for the purpose stated. The present application discloses many features of improvement over the disclosure of the prior copending application, Serial No. 401,831, and over other prior forehearth structures in which regulable control of the temperature and condition of the glass has been attempted. Many of such features of improvement will be hereinafter particularly pointed out and others will become apparent from the following description.

An object of the present invention is to provide an improved forehearth construction in which provision is made for bringing the glass of a stream from the melting tank to the desired temperature and viscosity throughout substantially the entire cross section of the stream in an improved manner before the glass stream reaches the delivery end portion of the glass conducting channel and for thereafter providing a stabilized condition of uniform temperature in the glass as it passes to the place of feeding or removal of portions of such glass and while it remains at such place.

A further object of the invention is the provision in the forehearth of the character described of improved means for applying heat to glass of the stream, whereby either liquid fuel or gaseous-fuel burners may be employed without material change of the forehearth structure.

A further object of the invention is the provision in a forehearth having a longitudinal slot or opening at its top and adjustable covers for controlling radiation of heat from the glass through such slot or opening of improved means for adjusting such covers quickly and conveniently to control regulably and accurately the amount of said radiation.

A further object of the invention is to provide in a forehearth of the character described improved means for obtaining practically complete combustion of liquid fuel in a space in communication with the glass conducting channel and for directing the flame resulting from such combustion onto the glass without subjecting the glass to the harmful action of unconsumed particles of the combustible mixture.

A further object of the invention is the provision of a forehearth having improved means for effecting the desired regulation of temperature and viscosity throughout the cross section of the stream as the glass flows from the melting furnace along a portion of the flow channel and for thereafter equalizing the temperature condition in the glass and for stabilizing such condition as the glass flows along a further portion of the flow channel to the place at which glass is to be fed through an outlet or otherwise removed.

A further object of the invention is the provision of improved means for regulably controlling temperature and draft conditions to which glass in a portion of the flow channel and at the place of discharge or removal of such glass will be subjected.

A still further object of the invention is the provision in a forehearth structure of the character described of improved means for effecting both desirable combustion of a fluid fuel from a burner and for controlling the velocity and extent of the flame that will be projected from said burner onto the glass in a portion of the forehearth.

Other objects and advantages of the invention will become apparent from the following description when it is considered in conjunction with the accompanying drawings, in which:

Fig. 3 is a plan sectional view of the outer portion of the forehearth structure, the section having been taken approximately along the line 3—3 of Fig. 1;

Fig. 4 is a relatively enlarged face view of a burner assembly and a support therefor at the rear end of one of the side combustion chambers of the outer end portion of the forehearth; and Fig. 5 is a vertical section through the burner assembly of Fig. 4, the view being substantially along the line 5—5 of Fig. 4.

Figure 1:
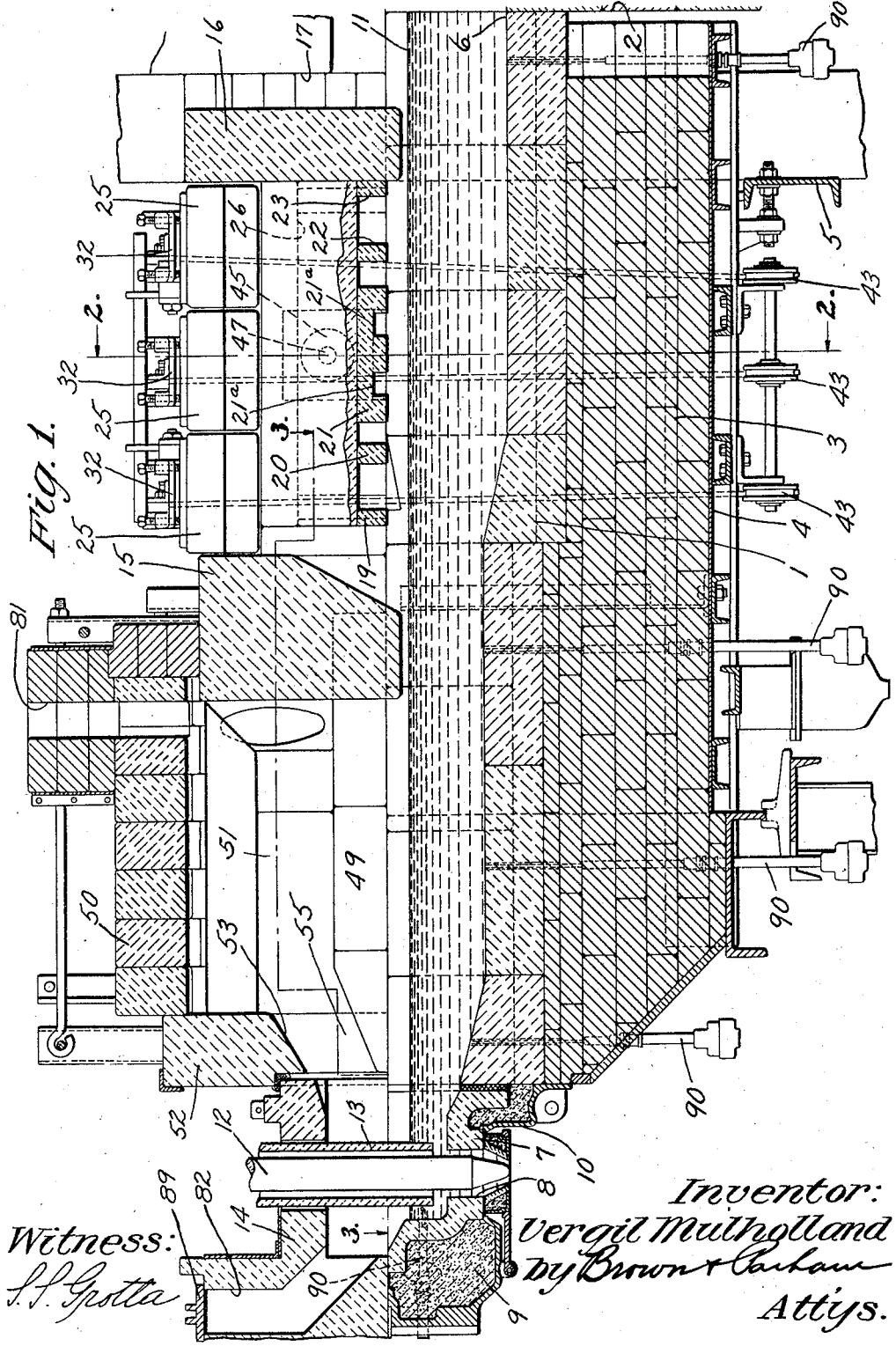
Figure 1 is a longitudinal vertical section through a forehearth equipped with improvements embodying the invention, a portion of the side wall above the forehearth channel being broken away and certain operating and supporting parts of the complete forehearth structure being omitted, the view being approximately along the line indicated at 1—1 in Fig. 2.

In carrying out the invention, the improved forehearth may be disposed appurtenant to a glass melting tank so that glass from such tank will flow in a stream into and along the forehearth channel. This forehearth channel is suitably supported and insulated so that radiation of heat through the walls of the channel will be reduced to a minimum. At the outer end of the forehearth channel, a bowl or spout having a bottom delivery outlet may be provided as an extension of the forehearth. A gathering basin for suction gathering receptacles or other suitable known means for holding glass to permit removal of portions thereof may be provided in lieu of the feed bowl or spout.

The upper structure of the forehearth preferably is formed for cooperation with said channel to provide a rear enclosed temperature regulating or conditioning chamber extending for part of the length of the forehearth and an enclosed temperature equalizing and stabilizing chamber extending for the remainder of the length of the forehearth and including the space above the glass in the feed bowl or spout when the forehearth is equipped with the latter. A "sting-out" space preferably is provided at the rear end of the forehearth between the upper forehearth structure and the adjacent wall of the melting furnace so that the temperature above the glass in the rear temperature regulating or conditioning chamber will not be materially affected by heat gases from the space above the glass in the furnace. Also, the space above the glass in the front chamber preferably is practically separated from the space above the glass in the rear chamber.

It is usual in practical glass working operations for the temperature of the glass entering the flow channel of the forehearth to be higher than that desired for the glass to be fed or removed. Lowering of the temperature of the glass at the middle of the stream and controlled application of heat to the glass at the sides of the stream therefore may be employed to regulably control the temperature of the glass as it flows through the rear or conditioning chamber.

A longitudinal slot or opening is provided in the top of the forehearth above the rear or conditioning chamber. Radiation through such slot of heat from the underlying glass of the stream may be controlled by pairs of cooperative pivoted cover sections or shutters. The shutters of each pair preferably are opened and closed simultaneously and to the same extent by maipulation of a single operating member.

Combustion chambers or firing spaces are provided at the sides of the rear or conditioning chamber. The side combustion chambers or firing spaces may extend for practically the entire length of the rear chamber. Baffles are arranged at the inner sides of such combustion chambers, preferably outwardly of the space above the glass in the channel, for preventing direct projection of flame from burners at the outer sides of such combustion chambers onto the glass in the channel and for distributing flames from the burners throughout the length of the side combustion spaces so that flames from such combustion chambers may pass through narrow passages onto the glass of the side portions of the stream in the form of thin sheets of flame extending substantially the full length of the conditioning chamber. Air to promote and support combustion may be admitted around the burner tips. The dimensions of the combustion chambers, the positions and characters of the baffles, the burners, and the inlet for the air around the burner tips are selected with relation to one another and with respect to the position of the narrow passages for applying flame to the glass so that practically complete combustion will be produced at a relatively short distance from the burner tips, even when liquid fuel is used, and no unconsumed fuel particles are projected into contact with the glass.

Improved means are provided for controlling draft and temperature conditions in the space above the glass in the stabilizing chamber and above the glass at the place at which glass is to be fed or otherwise removed. Such improved means preferably includes burners at the rear of the side combustion portions of the stabilizing chamber for directing flames forwardly and inwardly along the surface of the glass but also means for regulably controlling the admission of air around the burners so that combustion will be complete before contact of any unconsumed particles of combustible mixture with the glass and so that the velocity and extent of projection of flame from the burners in the stabilizing chamber may be regulably controlled.

Damper controlled stacks also may be provided at both the front and rear of the stabilizing chamber for aiding in controlling the temperature and draft conditions therein.

Referring now to the drawings, a forehearth channel, generally indicated at 1, is shown appurtenant to a wall 2 of a glass melting furnace, not shown. The forehearth channel is made of suitable refractory material and is suitably supported and insulated, as by the fire brick 3, the metallic casing 4 and the frame structure 5, Fig. 1. The arrangement is such that the forehearth channel will be maintained continuously in proper position to receive molten glass in a stream from an outlet 6 of the glass melting furnace. The particular means for insulating and supporting the forehearth channel may vary considerably in structural features from that shown in the drawings. For example, such supporting and insulating structure may be substantially the same as that of the well known Hartford single feeder, a disclosure of which may be found in Patent No. 1,760,254, granted May 27, 1930, to Karl E. Peiler, assignor to the Hartford-Empire Company.

A feed spout 7, having a bottom discharge outlet 8, is shown in Fig. 1 at the outer end of the forehearth channel 1, as an extension of the latter, and is suitably secured in position in any suitable known manner. The feed bowl 7 is shown as being provided with granular insulating material 9, retained in place by an outer casing 10. The latter may be attached to the supporting casing and frame structure of the forehearth proper.

The glass from the furnace outlet 6 flows in a stream, indicated at 11, along the forehearth channel to the feed spout so as to submerge the outlet 8 in the latter. The discharge of glass through the outlet 8 may be controlled by an implement 12 which may be reciprocated in the glass in working alignment with the outlet. The flow of glass to the outlet may be controlled by a tubular member 13 which surrounds the implement 12 and may be adjusted vertically and/or rotated in the manner and for the purposes now well known in the glass working art.

The implements 12 and 13 depend through a suitable opening that is provided in the cover structure 14 for the bowl.

The upper forehearth structure includes a transverse refractory partition 15 which may be located at a place approximately midway of the distance from the outlet in the furnace to the place at which the glass is to be fed or removed at the outer end of the forehearth channel. A rear transverse refractory wall 16 spans the rear end of the forehearth channel and may be spaced from the adjacent wall of the furnace, as at 17, sufficiently to permit a "sting-out" of heated gases from the space above the glass in the furnace. The refractory members 15 and 16 have their lower edges spaced but slightly, if at all, above the level of the glass stream 11 in the forehearth channel.

The portion of the upper forehearth structure between the refractory members 15 and 16 cooperate with such members and with the underlying portion of the channel 1 to provide the aforesaid rear temperature regulating or conditioning chamber. The side walls of such chamber include the members 18, Fig. 2, supported on the side walls of the forehearth channel 1 by the combined supporting and flame distributing blocks 19, 20, 21, 22 and 23, Fig. 1. The temperature regulating or conditioning chamber referred to, indicated at 24 in Fig. 2, is closed more or less at its top by a longitudinal series of pairs of hinged refractory cover sections or shutters 25.

Extending along the sides of the conditioning chamber 24 are side firing chambers or combustion spaces 26. These side combustion chambers 26 have refractory top walls 27, the upper faces of which preferably are flush with the upper surfaces of the refractory members 18. The top walls 27 are suitably supported, as by refractory blocks, such as indicated at 28 in Fig. 3; shoulders 29 on portions of the members 18, as shown in Fig. 2; end walls of the said combustion spaces, such as indicated at 30 in Fig. 3; and outer side walls of such spaces, as indicated at 31 in Figs. 1 and 3.

Figure 2:
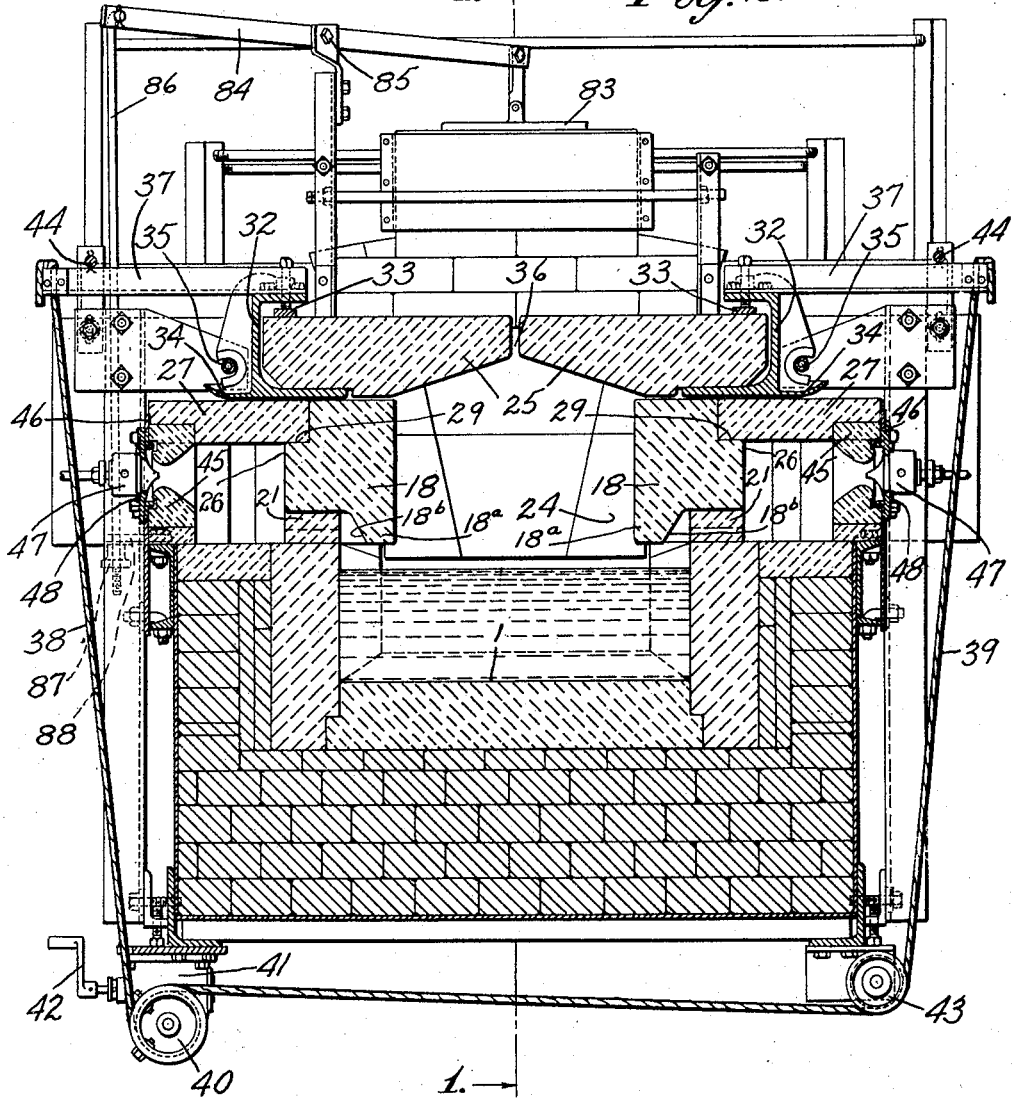
Fig. 2 is a transverse vertical section through the forehearth structure, the view being approximately along the line 2—2 of Fig. 1.

The top walls 27 of the side combustion spaces cooperate with the inner walls 18 of such combustion spaces to support substantially U-shaped holders 32, Fig. 2, in which the outer portions of the shutters 25 are secured, as by means of the clamping devices 33. The web portions of such holders are provided at their bottoms with curved outwardly extending portions, constituting rockers 34, on which the holders and the shutters may rock about the axes of fulcrum rods 35. The fulcrum rods 35 may be secured to any suitable parts of the general frame work structure. When the lower flanges of the substantially U-shaped holders rest flatly on the supporting walls of the side portions of the forehearth structure, the shutters of each pair will be disposed horizontally, as shown in Fig. 2. This is the closed position of such shutters, and in such closed position, their adjacent ends may be spaced slightly apart, as indicated at 36, to permit escape of heated gases from the conditioning chamber.

The means for opening and closing the shutters of each pair simultaneously will now be described. Such means comprise oppositely extending arms 37 secured at their inner ends to the upper flanges of the shutter holders and extending outwardly beyond the side walls of the forehearth. Flexible cables 38 and 39, respectively, are shown as being attached at their upper ends to the outer ends of the arms 37 for the shutters of each pair. These cables may be chains, as shown, or may have any other suitable construction. The cable 38 extends downwardly along the adjacent side of the forehearth structure to the periphery of the wheel 40, which constitutes a part of a manually operable speed reduction unit 41, having an operating handle 42. The speed reduction unit 41 may be of any suitable known construction, such as an assembly that may be obtained commercially as an entity. Such unit may be secured adjustably as shown to the frame work structure of the forehearth. The cable 39 extends downwardly at the opposite side of the forehearth around an idler pulley or wheel 43 and thence transversely across the space beneath the forehearth structure to the wheel 40, to which the cable 39 also is attached. The arrangement is such that when the handle 42 is turned in one direction, the wheel 40 will be rotated to wind both the cables 38 and 39 thereon in the same direction and thereby to rock the shutters 25 of one pair upwardly about the axes of the fulcrum rod 35. This will enlarge the space between the adjacent ends of the shutters of that pair and also will increase the height of the available space for the radiation of heat from the glass in the channel. The raising of the shutters may be continued by turning the handle 42 until radiation of heat from the middle portion of the glass in the channel between the members 18 and the shutters 25 of that pair is practically unrestricted. The turning of the handle 42 in the opposite direction will permit unwinding of the cables 38 and 39 and the shutters will be lowered until the outer end portions of the arms 37 contact with longitudinally extending stop members 44, thereby preventing the inner ends of the shutters of each pair from swinging downward below the closed position of such shutters, shown in Fig. 2. Thus, the shutters of each pair may be opened and closed simultaneously, independently of the remaining shutters, it being understood that an adjusting unit 41 is provided and suitably connected with each pair of shutters.

The outer side walls 31 of the combustion spaces are provided intermediate their ends with suitable openings for the reception of burner blocks 45, as shown in Figs. 1 and 2. Each of these burner blocks may be retained in place by a plate 46 which also serves to center and support a burner 47 for projecting a mixture in combustion through the bore of the burner block. The burner is spaced from the bore of the burner block to permit the ingress of more or less air through ports in the plate 46 and through similar ports in a rotary annular valve plate 48 which surrounds the burner blocks. Desirable features of the particular burner and block construction will be hereinafter described in greater detail as also being included in a corresponding unit at each of the sides of the outer end portion of the forehearth.

The rear side firing spaces 26 are disposed laterally outward from the glass in the forehearth channel. The flame from the burners 47 into the combustion chambers 26 strike the refractory members 18 and the outer faces of the blocks 21, which are directly in line with the burner nozzles. The blocks 21 have spaces 21a at their lower edges, out of line with the burner nozzle, through which part of the flame from the burner may pass. The remainder of the flame from the burner is divided, by reason of its contact with the refractory members 18 and 21, and is distributed both rearwardly and forwardly in the combustion spaces 26, portions thereof being permitted to pass through the spaces between adjacent blocks 19, 20, 21, 22 and 23, beneath the portion of the refractory member 18 that is superimposed on such supporting blocks. These supporting blocks and the superimposed portion of the member 18 are positioned laterally outward of the glass in the forehearth channel. Thus, the flame from each of the burners 47 is retarded in its movement toward the glass in the forehearth channel. This retardation of the flame together with the feature of admitting air around the burner and the character of operation of the burner proper, permits the use of liquid fuel without subjecting the glass in the forehearth channel to the action of any unconsumed parts of the fuel mixture, practically complete combustion taking place in the combustion space.

The inner portions of each of the refractory members 18 is enlarged downwardly, as indicated at 18a, toward the side portions of the stream of glass in the forehearth channel, thereby providing baffle lips and relatively narrow downwardly and inwardly directed passages 18b between the baffle lips and the adjacent side walls of the forehearth channel. The flames from the side combustion spaces 24 pass through the spaces between the supporting blocks 19, 21, 22 and 23 and through the apertures 21a at the lower edges of the block 21 against the downwardly and inwardly beveled outer walls of the lips 18a and are deflected in long, narrow sheets of flame onto the side portions of the glass stream in the forehearth channel.

The upper forehearth structure in advance of the conditioning chamber 24 cooperates with the underlying portion of the forehearth channel 1 and with the transverse member 15 to provide a second chamber, indicated at 49 in Figs. 1 and 3. The space above the glass in this second chamber is practically separated from the space above the glass in the conditioning chamber 24 by the transverse partition 15. The top of the chamber 49 may be formed of suitable refractory blocks, such as indicated at 50 in Fig. 1, suitably arranged and supported so as to form a transversely arched cover. The front chamber 49 has open communication at its sides with a pair of wing extensions, formed of suitable refractory blocks, as shown in Figs. 1 and 3, so as to provide a pair of side combustion chambers 51. Each chamber 51 enlarges in cross sectional area toward its rear end. Thus, the outer side walls of these side combustion chambers 51 lie in planes which converge substantially at the central point of the front wall of the feeder bowl, as shown in Fig. 3. The front wall of the upper part of the front chamber 49 comprises a transverse refractory block 52 which preferably has its bottom wall beveled downwardly and forwardly, as indicated at 53, and has side downward extensions or leg portions 54, formed with forwardly and inwardly beveled inner walls 55, whereby forwardly moving heated gases and flame from the forward side firing spaces 51 will be directed both downwardly and forwardly and inwardly and forwardly into the space above the glass in the feed bowl.

The rear walls of the forward side firing spaces comprise refractory burner blocks, each of which preferably comprises an outer refractory member 56, having a bore consisting of a relatively large circular outer end portion 57 of substantially uniform diameter throughout its length, intermediate portion 58 of decreasing diameter toward its inner end and of less diameter at its outer end than the diameter of the portion 57 whereby an annular shoulder 59 is provided, and an inner end portion 60 of increasing diameter toward its forward end. The shoulder 59 and the outer end portion 57 of the refractory member 56 constitutes a seat with which radial fins 61 on the annular inner refractory member 62 of the burner block engage so as to support the latter in concentric relation with the inner walls of the outer member 56. The outer walls of the inner member 62, between the radial fins 61, taper forwardly as indicated at 63, while the inner walls of the member 62 are curved longitudinally, as best seen in Fig. 5, so as to provide an inwardly tapering rear end portion 64 and an outwardly enlarging main portion 65 of the bore of the member 62, for a purpose to be presently described.

The inner member 62 of the burner block is held in place in the outer member 56 by a clamping plate 66, which may be secured by cap screws 67 to adjacent portions of the forehearth frame, as to the parts indicated at 68. Luting may be provided between the plate 66 and the members of the burner block so as to make air tight joints therebetween.

The clamping plate 66 is provided with an annular series of ports 69 in register with the spaces between the fins 61 of the member 62. An annular rotary valve 70 is provided with ports 71 corresponding in number, relative arrangement and size with the ports 69, whereby more or less air may be admitted through ports 71—69 and the spaces between the fins 61 to the interior of each of the side firing spaces 51 or the valve plate 70 may be turned so as to prevent ingress of any air to the ports 69. The plate 66 is provided with a central opening 72, axially aligned with the bore of the inner member 62 of the burner block. A fuel burner 73 is mounted in this opening so that the nozzle of such burner projects into the bore of the member 62. The burner 73 may be either a gaseous fuel or a liquid fuel burner. The particular burner shown in the drawings is adapted for the use of liquid fuel and is of the type disclosed and claimed in the applicant's Patent 1,646,703, granted October 25, 1927. A burner of this type includes a tubular conduit 74 for introducing atomizing air into the annular space between the fuel tube 75 of the burner and the casing of the burner.

A portion of the clamping plate 66 immediately surrounding the burner and inwardly of the annular series of ports 69 is provided with an inner annular series of ports 76. Each of these ports communicates with the forwardly and inwardly directed annular space between the forwardly projecting tube 77 of the burner nozzle and the portion 64 of the inner wall of the member 62 of the burner block. A rotary valve 78 is provided with ports 79 corresponding in number, size and relative arrangement with the ports 76. The arrangement is such that the valve 78 may be turned about the axis of the burner to open the ports 76 more or less to the atmosphere or to completely close such ports. The burner block as a whole is maintained in position at the rear end of the associate forward side combustion space 51 by the plate 66 and by reason of the fit of the outer member of the burner block with a seat 80 in the adjacent walls of the combustion chamber.

With the arrangement just described, an atomized mixture of air and liquid fuel in combustion will be projected from the burner tip forwardly and inwardly into the chamber 49 and toward or into the space above the glass in the feed spout. The air admitted from the atmosphere through the ports 79—76 and the bore of the inner member 62 of the burner block not only will aid in supporting combustion so that no unconsumed particles will be projected into contact with the glass but may be utilized to regulate the extent of forward projection of flame from the burner toward the front wall of the feed spout. Thus, the air through the ports 79—76 may pass through the forwardly and inwardly directed restricted passage at the burner tip at a sufficient velocity to cause the flame from the burner tip to be projected forwardly substantially to the front wall of the feeder bowl.

Air for supporting combustion also may be admitted through the ports 71—69 and the larger spaces at the outer side of the inner member 62 of the burner block. Such air will flow in an annular stream which will aid combustion at the forward end of the inner member 62 but may not have the velocity of the inner annular stream of combustion supporting air. Thus, if it is desired to project the flame a relatively great distance forwardly from the burner tip, the valve 78 is turned to admit air through the ports 79—76. If it is desired to modify the action of the inner annular stream of combustion supporting air somewhat, the valve 70 also may be opened to admit the outer more sluggish annular stream of air. Another mode of operation of the burner would be to close the inner valve 78 and to open the outer valve 70, thereby shortening the extent of projection of the flame from the burner and producing a more widely distributed flame over the glass in the stabilizing chamber and in the feed spout. Many combinations of adjustments of the two valves 70 and 78 will be useful in controlling the extent of projection of the flame from the burner 73 and the character and distribution of such flame.

The hereinbefore described burners 47 at the sides of the rear combustion spaces and the burner blocks 45, associated therewith, may have substantially the structural features of the more fully described burner 73 and the inner member 62 of the burner block, the outer series of ports for the admission of combustion supporting air being omitted. Obviously, a burner and burner block assembly, such as herein described as being applied to the forward combustion chambers, may be employed with each of the rear side combustion chambers.

The front chamber above the glass in the forehearth channel is provided with stacks 81 and 82, respectively, located at the rear and forward ends thereof. As best seen in Fig. 1, the stack 81 communicates with the front chamber 49 directly in front of the rear wall 15 of the latter while the stack 82 constitutes a forward and upward extension of the cover 14 of the feeder spout. A damper 83 is provided for regulating the draft through the stack 81 and the volume of gases permitted to escape therefrom. This damper may be raised and lowered by suitable operating means, such as the lever 84, fulcrumed intermediate its length at 85 and pivotally connected at one end with the damper 83 and at its other end with an adjusting rod 86. The raising and lowering of the adjusting rod may be effected by turning an adjusting nut 87 on a threaded portion of the rod 86, such nut being arranged to bear against a fixed member 88 through which the adjusting rod 86 extends. The stack 82 also is provided with a damper 89 and with suitable means, not shown, for raising and lowering the damper. Such means may be the same as that just described as applied to the damper 83.

Operation of the improved forehearth may be substantially as follows. If the molten glass passes from the melting furnace at a temperature higher than that desired for the portions of glass to be fed or otherwise removed at the outer end of the forehearth, as is usual, the pairs of shutters 25 may be opened more or less to effect the desired cooling of the middle portion of the glass stream during the passage of such stream through the conditioning chamber 24. At the same time, flame from the burners 47 may be applied to the glass of the side portions of such stream to prevent undue chilling and lagging of such side portions of a stream. Preferably, the cooling of the middle portion of the stream and the heating or maintenance of temperature of the side portions of the stream are such as to bring the stream throughout practically its entire cross section to the temperature desired at the time such stream passes from the rear conditioning chamber into the forward stabilizing chamber of the forehearth structure. If this condition has been attained, the flames from the burners 73 are regulated and controlled as to intensity, extent of projection, and distribution so as to assure equalization of temperature in the glass in the stabilizing chamber and in the feed spout and to maintain the temperature desired. Obviously, temperature regulating effects in the front chamber may be produced if required.

The dampers for the stacks 81—82 may be adjusted with relation to one another to cooperate with the burners to regulably control the distribution of heat throughout the space over the glass in the stabilizing chamber and feed spout and to regulably control draft conditions in the space above the glass forwardly of the transverse partition member 15.

By closing all the shutters 25, radiation of heat from the middle portion of the stream passing from the melting furnace may be reduced to a minimum so that the temperature of the glass leaving the melting furnace may be substantially maintained. Various effects may be produced by various adjustments of the respective burners and radiation, permitting or preventing shutters, dampers, etc., so as to regulably control the temperature and condition of the glass to the end that satisfactory glass will be provided at the place of feeding or removal. Preferably, the glass is brought to the proper temperature and condition at an early point along its path of movement from the melting furnace toward the place of feeding or delivery of glass and then equalization and maintenance of such temperature and condition are effected and maintained in the glass during the remainder of its movement along the forehearth channel and until such glass has been fed through the bottom delivery outlet of the feed spout or otherwise removed.

Temperature responsive devices, such as thermo-couples, as shown more or less diagrammatically at 90 may be provided in contact with the glass at various places along the length of the forehearth channel and in the feed spout for indicating the temperature of the glass at such places. Such devices may be of any suitable known type and construction.

While the invention has been described as including features which are particularly adapted for the advantageous use of liquid-fuel burners, heat may be applied by the use of gaseous-fuel burners or other means for applying heat to the glass, such as electric heating elements, may be used. Also, it is obvious that the features of the invention are susceptible of modification and change from those specifically illustrated and described herein without departing from the spirit and scope of the invention.

I claim:

1. A forehearth comprising a covered channel along which a stream of molten glass may flow from a melting furnace, means providing a combustion chamber extending along a portion of said covered channel for a substantial part of the length of the channel, said combustion chamber having communication through a narrow passage with the space above the glass in said channel, said passage extending the major portion of the length of the combustion chamber, a burner at the outer side of said chamber for projecting a flame in said combustion chamber toward the covered channel and in the general direction of said communicating passage, and baffle means in the path of flame from the burner for diffusing such flame in the combustion chamber along the communicating passage and for preventing projection of flame from the burner directly into said communicating passage.

2. A forehearth comprising a covered channel along which a stream of molten glass may flow from a melting furnace, means providing a combustion chamber extending along a portion of said covered channel for a substantial part of the length of the channel, said combustion chamber having communication through a narrow passage with the space above the glass in said channel, said passage extending the major portion of the length of the combustion chamber, a burner at the outer side of said chamber for projecting a flame in said combustion chamber toward the covered channel and in the general direction of said communicating passage, means for admitting air around said burner into said combustion chamber to promote and support combustion, and baffle means in the path of flame from the burner for diffusing such flame in the combustion chamber along the communicating passage and for preventing projection of flame from the burner directly into said communicating passage.

3. A forehearth comprising a channel for receiving molten glass from a melting furnace and for conducting such glass to a place at which glass is to be fed or otherwise removed, means providing a conditioning chamber for the glass in a portion of the channel adjacent to the melting furnace, means providing a pair of side combustion chambers extending along the sides of said conditioning chamber, burners for projecting flames into said side combustion chambers, and means located laterally outward beyond the space above the glass is said conditioning chamber for preventing direct projection of said flames onto the glass in the channel and for diffusing such flames in said combustion chambers.

4. A forehearth comprising a channel for receiving molten glass from a melting furnace and for conducting such glass to a place at which glass is to be fed or otherwise removed, means providing a conditioning chamber for the glass in a portion of the channel adjacent to the melting furnace, means providing a temperature equalizing and stabilizing chamber for the glass in the outer end portion of said channel, means controlling temperature and draft conditions in said equalizing and stabilizing chamber, means providing a pair of side combustion chambers extending along the sides of said conditioning chamber, burners for projecting flames into said side combustion chambers, and means located laterally outward beyond the space above the glass in said conditioning chamber for preventing direct projection of said flames onto the glass in the channel and for diffusing such flames in said combustion chambers.

5. A forehearth comprising a channel for receiving molten glass from a melting furnace and for conducting such glass to a place at which glass is to be removed, means providing a conditioning chamber over the glass in a portion of the channel adjacent to the melting furnace, means providing a temperature equalizing and stabilizing chamber above the glass in the outer end portion of said channel, means controlling temperature and draft conditions in said equalizing and stabilizing chamber, means providing a pair of side combustion chambers extending along the sides of said temperature regulating chamber, burners for projecting flames into said side combustion chambers, means located laterally outward beyond the space above the glass in said channel for preventing direct projection of said flames onto the glass in the channel and for diffusing such flame in said combustion chambers, and means permitting a regulably controlled radiation of heat from the middle portion of the stream through the top of said conditioning chamber.

6. A forehearth comprising a channel for receiving molten glass from a melting furnace and for conducting such glass in a stream to a place at which glass is to be removed, means providing a conditioning chamber over the glass in a portion of the channel adjacent to the wall of the melting furnace, means providing a pair of side combustion chambers extending along the sides of said temperature regulating chamber, burners for projecting flames into said side combustion chambers, means located laterally outward beyond the space above the glass in said channel for preventing direct projection of said flames onto the glass in the channel and for diffusing such flames in said combustion chamber, and means cooperating with said last named means for directing sheets of flame from said combustion chambers onto the glass of the side portion of said stream, said sheets of flame extending substantially the entire length of the conditioning chamber.

7. In a forehearth structure, a refractory channel for receiving molten glass from a source of supply and along which such glass may flow in a stream, a cover structure for the channel cooperating therewith to provide a conditioning chamber for the glass in a portion of the channel, a combustion space adjacent to the channel communicating with the space above the glass of a side portion of the stream through a narrow passage extending along the side of said conditioning chamber for the greater part of the length of the chamber, a baffle lip at the inner side of said passage for deflecting heated gases downwardly onto the glass at the adjacent side of said channel, a burner arranged to discharge laterally inward through the outer wall of said combustion chamber, said burner being located approximately intermediate the length of the combustion chamber, and baffle means extending parallel with said channel for preventing direct projection of flame from said burner into said communicating passage between the combustion chamber and the space above the forehearth channel and for distributing flame from the burner longitudinally of said communicating passage.

8. In a forehearth structure, a refractory channel for receiving molten glass from a source of supply and along which such glass may flow in a stream, a cover structure for the channel and cooperating therewith to provide a conditioning chamber for the glass in a portion of the channel, a combustion space adjacent to the channel communicating with the space above the glass of a side portion of the stream through a narrow passage extending along the side of said conditioning chamber for the greater part of the length of the chamber, a baffle lip at the inner side of said passage for deflecting heated gases downwardly onto the glass at the adjacent side of said channel, a burner arranged to discharge laterally inward through the outer wall of said combustion chamber, said burner being located approximately intermediate the length of the combustion chamber, and baffle means extending parallel with said channel for preventing direct projection of flame from said burner into said communicating passage between the combustion chamber and the space above the forehearth channel and for distributing flame from the burner longitudinally of said communicating passage, said baffle means being located laterally outward of the space above the glass in the forehearth channel.

9. In a forehearth structure, a refractory channel for receiving molten glass from a source of supply and along which such glass may flow in a stream, a cover structure for the channel and cooperating therewith to provide a conditioning chamber for the glass in a portion of the channel, a combustion space adjacent to the channel and communicating with the space above the glass of a side portion of a stream through a narrow passage extending along the side of said conditioning chamber for the greater part of the length of the chamber, a baffle lip at the inner side of said passage for deflecting heated gases downwardly onto the glass at the adjacent side of said channel, a burner arranged to discharge laterally inward through the outer wall of said combustion chamber, said burner being located approximately intermediate the length of the combustion chamber, baffle means extending parallel with said chamber for preventing direct projection of flame from said burner into said communicating passage between the combustion chamber and the space above the forehearth channel and for distributing flame from the burner longitudinally of said communicating passage, and means for admitting air adjacent to said burner tip to support combustion and to aid in effecting practically complete combustion at a relatively short distance from said burner tip.

Signed at Hartford, Connecticut, this 18th day of June 1930.

VERGIL MULHOLLAND.